US010036355B2

(12) United States Patent
Franks et al.

(10) Patent No.: US 10,036,355 B2
(45) Date of Patent: Jul. 31, 2018

(54) HEAT TRANSFERRING FUEL INJECTOR COMBUSTION SEAL WITH LOAD BEARING CAPABILITY

(71) Applicant: CUMMINS INC., Columbus, IN (US)

(72) Inventors: Gregory S. Franks, Edinburgh, IN (US); Joshua G. Knight, Columbus, IN (US); Joseph A. Worthington, Scipio, IN (US); Fred M. Rasener, Columbus, IN (US); L. Eric Stacy, Columbus, IN (US); Hanna Christine Small, Columbus, IN (US); Amit Yeole, Columbus, IN (US); Timothy John Monahan, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/006,056

(22) Filed: Jan. 25, 2016

(65) Prior Publication Data
US 2016/0138540 A1  May 19, 2016

Related U.S. Application Data

(63) Continuation-in-part of application No. 13/962,641, filed on Aug. 8, 2013, now Pat. No. 9,410,520.

(51) Int. Cl.
F02M 61/10 (2006.01)
F02M 59/00 (2006.01)
(Continued)

(52) U.S. Cl.
CPC .......... *F02M 53/043* (2013.01); *F02M 61/14* (2013.01); *F16J 15/064* (2013.01); *F02M 2200/858* (2013.01)

(58) Field of Classification Search
CPC .......... F02M 2200/858; F02M 53/043; F02M 61/14; F16J 15/02; F16J 15/021; F16J 15/022; F16J 15/10
(Continued)

(56) References Cited

U.S. PATENT DOCUMENTS 3,841,277 A   10/1974  Schaefer
3,868,939 A   3/1975   Friese et al.
(Continued)

FOREIGN PATENT DOCUMENTS

DE   3529769 A1   2/1987
EP   0440674 B1   8/1991
(Continued)

OTHER PUBLICATIONS

International Search Report and Written Opinion dated Nov. 13, 2014 in corresponding International Application No. PCT/US2014/047589.

Primary Examiner — Marguerite McMahon
Assistant Examiner — Tea Holbrook
(74) Attorney, Agent, or Firm — Faegre Baker Daniels LLP

(57) ABSTRACT

The present disclosure provides a fuel injector seal assembly comprising a seal member comprising a first section, a second section and an annular recess disposed in the first section, the first section having a first diameter and the second section having a second diameter wherein the first diameter is greater than the second diameter; and a sleeve member comprising a first end received by the first section of the seal member, the sleeve member further including a lengthwise portion configured to press fit around a nozzle housing of a fuel injector to cause heat transfer from the nozzle housing toward a body portion of the fuel injector.

24 Claims, 6 Drawing Sheets

(51) Int. Cl.
*F02F 11/00* (2006.01)
*F02M 53/04* (2006.01)
*F16J 15/06* (2006.01)
*F02M 61/14* (2006.01)

(58) Field of Classification Search
USPC ...... 123/470; 239/533.2, 128; 277/313, 591, 277/594, 598, 644, 650, 597
See application file for complete search history.

(56) References Cited

U.S. PATENT DOCUMENTS

| | | | |
|---|---|---|---|
| 3,945,353 A | 3/1976 | Dreisin | |
| 4,296,887 A | 10/1981 | Hoffmann | |
| 4,589,596 A * | 5/1986 | Stumpp | F02M 61/14 123/470 |
| 4,609,150 A | 9/1986 | Pane, Jr. et al. | |
| 4,620,516 A | 11/1986 | Reum et al. | |
| 5,337,961 A * | 8/1994 | Brambani | F23D 11/107 239/397.5 |
| 5,345,913 A | 9/1994 | Belshaw et al. | |
| 5,361,990 A * | 11/1994 | Pimentel | B05B 1/24 219/205 |
| 5,752,487 A * | 5/1998 | Harrell | F02M 55/025 123/470 |
| 5,785,024 A | 7/1998 | Takei et al. | |
| 6,073,938 A | 6/2000 | Abe et al. | |
| 6,076,356 A | 6/2000 | Pelletier | |
| 6,119,658 A * | 9/2000 | Jehle | F02M 61/14 123/41.31 |
| 6,155,236 A * | 12/2000 | Jehle | F02M 61/14 123/41.31 |
| 6,182,437 B1 | 2/2001 | Prociw | |
| 6,276,338 B1 * | 8/2001 | Kato | F02B 23/104 123/41.31 |
| 6,334,433 B1 * | 1/2002 | Sumida | F02M 61/14 123/470 |
| 6,460,512 B1 * | 10/2002 | Serio | F16J 15/0806 123/470 |
| 6,481,421 B1 | 11/2002 | Reiter | |
| 6,512,204 B1 | 1/2003 | Chiu et al. | |
| 6,892,707 B2 | 5/2005 | Reiter et al. | |
| 7,028,918 B2 | 4/2006 | Buchanan et al. | |
| 7,325,402 B2 | 2/2008 | Parker et al. | |
| 7,331,535 B2 | 2/2008 | Lambert et al. | |
| 7,513,242 B2 | 4/2009 | Morris | |
| 7,559,312 B2 | 7/2009 | Brauneis et al. | |
| 7,832,376 B2 | 11/2010 | Mueller et al. | |
| 7,832,377 B2 | 11/2010 | Lee et al. | |
| 7,918,209 B2 | 4/2011 | Fischetti et al. | |
| 8,015,816 B2 | 9/2011 | Hall | |
| 8,230,838 B2 | 7/2012 | Clark et al. | |
| 8,978,624 B2 | 3/2015 | Kamada et al. | |
| 2002/0162538 A1 * | 11/2002 | Krause | F02M 61/14 123/470 |
| 2003/0155432 A1 | 8/2003 | Buchanan et al. | |
| 2003/0155446 A1 | 8/2003 | Reiter | |
| 2003/0178784 A1 * | 9/2003 | Nakayama | F02M 61/14 277/460 |
| 2004/0060544 A1 | 4/2004 | Reiter et al. | |
| 2004/0080115 A1 | 4/2004 | Tsuchiya et al. | |
| 2006/0157034 A1 | 7/2006 | Gottlieb et al. | |
| 2007/0251503 A1 | 11/2007 | Buehner | |
| 2008/0018058 A1 * | 1/2008 | Kobayashi | F16J 15/062 277/650 |
| 2008/0246228 A1 | 10/2008 | Hanneke et al. | |
| 2008/0271713 A1 | 11/2008 | Morris | |
| 2008/0295806 A1 | 12/2008 | Chang et al. | |
| 2009/0294552 A1 | 12/2009 | Trapasso et al. | |
| 2011/0067653 A1 | 3/2011 | Clark et al. | |
| 2011/0132329 A1 * | 6/2011 | Hofmann | F02M 61/14 123/470 |
| 2011/0272495 A1 * | 11/2011 | Nunic | F02M 61/14 239/533.2 |
| 2012/0037124 A1 | 2/2012 | Peters et al. | |
| 2013/0014719 A1 * | 1/2013 | Sugiyama | F02M 61/14 123/188.1 |

FOREIGN PATENT DOCUMENTS

| | | | |
|---|---|---|---|
| GB | 423126 A * | 1/1935 | ............. F02M 53/08 |
| GB | 901338 A * | 7/1962 | ................ F01P 1/10 |
| RU | 2105186 C1 | 2/1998 | |

* cited by examiner

HEAT TRANSFERRING FUEL INJECTOR COMBUSTION SEAL WITH LOAD BEARING CAPABILITY

PRIORITY CLAIM

This application claims priority to U.S. patent application Ser. No. 13/962,641 the disclosure of which is expressly incorporated herein by reference in its entirety. This application is a Continuation-in-Part of U.S. patent application Ser. No. 13/962,641.

TECHNICAL FIELD

This disclosure relates to fuel injector seal assemblies for internal combustion engines.

BACKGROUND

An internal combustion engine with a fuel injector may require a combustion seal to keep combustion gases in a combustion chamber of the internal combustion engine from flowing into a passage surrounding the fuel injector. One challenge with such seals is that they may be inefficient in transporting or transferring heat away from a nozzle housing of the fuel injector, or if such seals transport heat away from a distal end of a nozzle element housing, the seals may have insufficient strength to resist yielding, which may ultimately permit leaks.

SUMMARY

In one embodiment of the present disclosure a fuel injector seal assembly is provided, comprising a seal member comprising a first section, a second section and an annular recess disposed in the first section, the first section having a first diameter and the second section having a second diameter wherein the first diameter is greater than the second diameter; a ring seal disposed in the annular recess intermediate the seal member and a sleeve member, the ring seal structured to at least one of seal combustion gases from moving toward a body portion of a fuel injector and secure the seal member to the fuel injector; and the sleeve member comprising a first end received by the first section of the seal member, the sleeve member further including a lengthwise portion configured to press fit around a nozzle housing of the fuel injector to cause heat transfer from the nozzle housing toward the body portion of the fuel injector. In another aspect of this embodiment, the sleeve member further comprises a second end and an inner surface dimensioned to exert a radial force inwardly on the nozzle housing along the lengthwise portion extending between the first end and the second end. In yet another aspect of this embodiment, the seal member is formed from a first material and the sleeve member is formed from a second material that is different from the first material. In a variant of this aspect, the first material is a stainless steel material and wherein the second material is a copper material. In a variant of this variant, the stainless steel material is SAE 303 and wherein the copper material is one of the group consisting of UNS C15100 and UNS C15000, including an H01 temper.

In another embodiment of the present disclosure an internal combustion engine is provided, comprising a mounting bore comprising a sealing surface; a fuel injector positioned in the mounting bore, the fuel injector comprising an injector body and a nozzle housing; and an injector seal assembly comprising a seal member and a sleeve member with a gap therebetween, the gap configured to inhibit clamp loads from being transmitted from the injector body through the sleeve member; wherein the sleeve member is press fit around the nozzle housing at an inner surface having a lengthwise portion that abuts the nozzle housing and the seal member is sealingly positioned around the sleeve member adjacent the injector body; the seal member further including an annular recess configured to receive a ring seal. In one aspect of this embodiment, the ring seal disposed between the seal member and the sleeve member, the ring seal structured to at least one of seal combustion gases from moving toward the injector body of the fuel injector and secure the seal member to the fuel injector. In another aspect of this embodiment, the seal member further comprises a first section and a second section, the first section having a first diameter and the second section having a second diameter that is less than the first diameter.

In yet another aspect of this embodiment, the mounting bore comprises a longitudinal axis and the sealing surface is formed at a first angle relative to the longitudinal axis. In a variant of this aspect, the seal member is positioned longitudinally between the injector body and the sealing surface to create a fluid seal between the seal member and the mounting bore. In another variant of this aspect, the seal member further comprises an outer angled surface configured such that a clamp load that holds the fuel injector in the mounting bore transfers load through a load path that includes an annular line of contact between the sealing surface and the outer angled surface to form a fluid seal between the seal member and the mounting bore. In yet another aspect of this embodiment, the sleeve member further comprises a first end and a second end, the sleeve member inner surface being structured to exert a radial force inwardly on the nozzle housing along the lengthwise portion that extends between the first end and the second end. In yet another aspect of this embodiment, the seal member is formed from a first material and the sleeve member is formed from a second material that is different from the first material.

In another embodiment of the present disclosure an internal combustion engine is provided, comprising a mounting bore comprising a sealing surface; a fuel injector positioned in the mounting bore, the fuel injector comprising an injector body and a nozzle housing; and an injector seal assembly including a seal member comprising an annular recess, a sleeve member and a ring seal disposed in the annular recess, the seal member being sealingly positioned adjacent the injector body and around the sleeve member, and the ring seal being structured to at least one of seal combustion gases from moving toward the injector body of the fuel injector and secure the seal member to the fuel injector; the injector seal assembly further including a gap between the seal member and the sleeve member, the gap configured to inhibit clamp loads from being transmitted from the injector body through the sleeve member; wherein the sleeve member comprises a first end that is received by the seal member and contacts the ring seal and, wherein the sleeve member comprises a lengthwise portion having an inner surface that is press fit around the nozzle housing. In one aspect of this embodiment, the seal member further comprises a first section having a first diameter and a second section having a second diameter, wherein the first diameter is greater than the second diameter and wherein the annular recess is disposed in the first section.

In another aspect of this embodiment, the sleeve member further comprises a second end and the sleeve member inner surface is structured to exert a radial force inwardly on the nozzle housing along the lengthwise portion that extends between the first end and the second end. In yet another aspect of this embodiment, the mounting bore further comprises a longitudinal axis and the sealing surface is formed at a first angle relative to the longitudinal axis. In a variant of this aspect, the seal member is positioned longitudinally between the injector body and the sealing surface to create a fluid seal between the seal member and the mounting bore. In yet another aspect of this embodiment, the seal member further comprises an outer angled surface such that a clamp load that holds the fuel injector in the mounting bore transfers load through a load path that includes an annular line of contact between the sealing surface and the outer angled surface to form a fluid seal between the seal member and the mounting bore.

In another embodiment of the present disclosure; an injector seal assembly is provided, comprising: a spacer component including an annular recess configured to receive a ring seal, the spacer component formed of a first material and structured to be positioned in a space between a fuel injector body and an engine cylinder head sealing surface; and a thermally conductive component formed of a second material and structured to be positioned radially between the fuel injector body and the spacer component in contact with the fuel injector body and the spacer component to transfer heat from the fuel injector body to the spacer component; wherein the second material has a higher thermal conductivity than the first material.

In another aspect of this embodiment; the spacer component is structured to receive a fuel injector clamp load and transmit the fuel injector clamp load to the engine cylinder head sealing surface independent of the thermally conductive component. In yet another aspect of this embodiment; the thermally conductive component comprises heat transfer sleeve having a first end structured to engage a tip of the fuel injector body and a second end structured to engage the spacer component, the heat transfer sleeve being configured to transfer heat from the fuel injector tip to the spacer component. In yet another aspect of this embodiment, the first end of the heat transfer sleeve is dimensioned to exert a radial force inwardly on the fuel injector body. In yet another aspect of this embodiment, the first material is a stainless steel material and the second material is a copper material.

Advantages and features of the embodiments of this disclosure will become more apparent from the following detailed description of exemplary embodiments when viewed in conjunction with the accompanying drawings.

DETAILED DESCRIPTION

Figure 1:
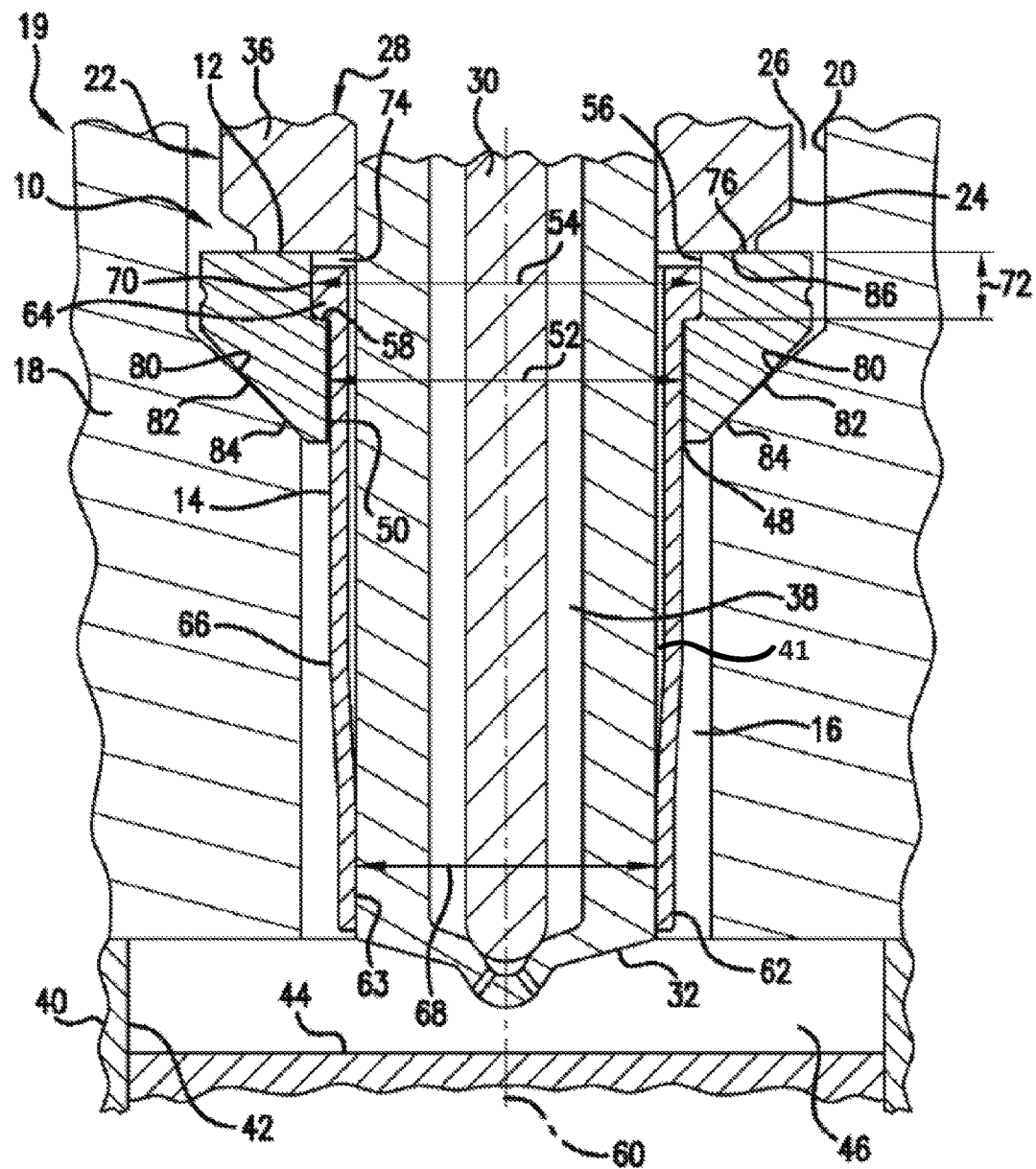
FIG. 1 is a cross-sectional view of an injector seal assembly in accordance with a first exemplary embodiment of the present disclosure inserted into position in an engine mounting bore.
Figure 2:
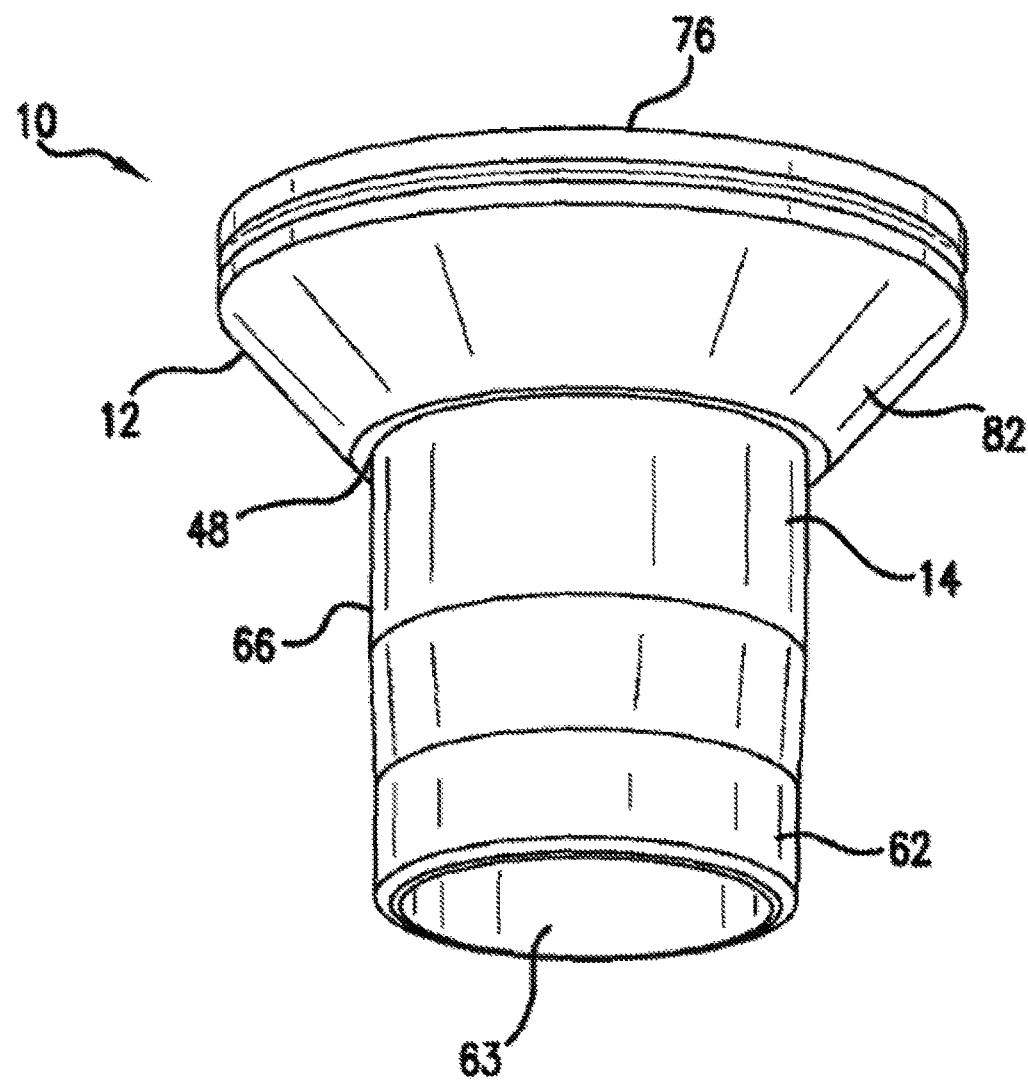
FIG. 2 is a perspective view of the injector seal assembly of FIG. 1.

An exemplary embodiment of an injector seal assembly, generally indicated at 10 in FIGS. 1 and 2, includes a seal component, sealing ring, or spacer component 12 formed of a first material, and a heat transfer sleeve, heat transfer inner sleeve, or thermally conductive component 14 that is formed of a second material that is different from the first material, for positioning in a fuel injector mounting bore 16 formed in a portion, e.g, cylinder head 18, of an engine body 19 of an internal combustion engine. While sealing ring 12 and thermally conductive component 14 are formed as distinct or separate components, in the exemplary embodiment they are connected to each other to form injector seal assembly 10, described in more detail hereinbelow. Cylinder head 18 includes an interior surface 20 that forms fuel injector mounting bore 16. The internal combustion engine also includes a fuel injector 22, which includes a peripheral exterior surface 24, positioned in fuel injector mounting bore 16. Interior surface 20 of fuel injector mounting bore 16 and exterior surface 24 of fuel injector 22 forms an annular gap or passage 26 that extends radially between fuel injector 22 and cylinder head 18. Engine body 19, which includes cylinder head 18, also includes an engine block 40 to which cylinder head 18 is attached. Engine block 40 includes one or more cylinders 42, and a piston 44 positioned for reciprocal movement in each cylinder 42. During longitudinal movement of piston 44 toward fuel injector 22, fuel injector 22 injects fuel into a combustion chamber 46 formed by the portion of cylinder 42 that extends from piston 44 to cylinder head 18.

The process of combustion needs to be separated from annular gap or passage 26 or damage to fuel injector 22, cylinder head 18, and other components of the internal combustion engine can occur. While it is known to position a seal between a fuel injector and a cylinder head, such seals have an array of challenges. For example, the seal must be able to carry a fuel injector clamp load to maintain structural integrity when clamped between fuel injector 22 and cylinder head 18. While injector seal assembly 10 achieves the core benefit of combustion sealing, it beneficially combines combustion sealing with an enhanced ability to conduct, transfer, or wick heat away from the distal end of fuel injector 22 to maintain the reliability of fuel injector 22. Injector seal assembly 10 addresses these challenges by fabricating sealing ring 12 of a metal able to withstand the fuel injector clamp loads transmitted through fuel injector 22 into sealing ring 12 and then into cylinder head 18, and by fabricating separate heat transfer sleeve 14 of a metal having a higher thermal conductivity than the material of sealing ring 12. Additionally, the contact between sealing ring 12, heat transfer sleeve 14, fuel injector 22, and cylinder head 18 is optimized to transfer heat from the distal end of fuel injector 22 upwardly to a cooler portion of fuel injector 22, providing a thermal path for heat from the distal end of fuel injector 22.

Throughout this specification, inwardly, distal, and near are longitudinally in the direction of combustion chamber 46. Outwardly, proximal, and far are longitudinally away from the direction of combustion chamber 46.

Fuel injector 22 includes a plurality of components, including an injector body 28 in which is positioned a needle or nozzle valve element 30. Fuel injector 22 includes other elements, including an actuator (not shown). Injector body 28 includes a nozzle element housing 32 and a housing retainer 36 that attaches nozzle element housing 32 to fuel injector 22. Injector body 28 also includes a nozzle element cavity 38 in which nozzle valve element 30 is positioned for reciprocal movement along a fuel injector longitudinal axis 60. Nozzle element housing 32 includes a nozzle housing diameter.

Annular gap or passage 26 is simply, easily and reliably sealed from combustion chamber 46 to isolate annular gap or passage 26 from combustion chamber 46 by insertion of injector seal assembly 10 between fuel injector 22 and a portion of the internal combustion engine, e.g., cylinder head 18. More specifically, sealing ring 12 is positioned longitudinally between injector body 28 and a sealing surface formed in fuel injector mounting bore 16. Injector seal assembly 10 provides a metal to metal combustion seal with contact pressures high enough to yield sealing ring 12 into sealing contact against interior surface 20 of injector mounting bore 16, and then maintain that contact pressure with the force from the fuel injector 22 mounting or securement system (not shown). That is, the injector clamping or securing load, for securing fuel injector 22 in mounting bore 16, is relied upon to apply a sealing force to sealing ring 12. In an exemplary embodiment, injector mounting bore 16 includes a sealing surface 80 positioned at an angle to longitudinal axis 60, thus providing a conical sealing surface, and sealing ring 12 includes sealing ring angled surface 82 that contacts bore angled surface 80 when sealing ring 12 is positioned longitudinally between injector body 28 and sealing surface 80 in injector mounting bore 16. The contact between sealing ring angled surface 82 and sealing surface 80 forms a fluid seal. In an exemplary embodiment, bore angled surface 80 is at a full angle of about 90 degrees, and sealing ring angled surface 82 is at a full angle of about 87.25 degrees, which is an angle of about 43.625 degrees with respect to longitudinal axis 60. The clamp load that holds fuel injector 22 in injection mounting bore 16 transfers load through a load path that includes an annular line of contact 84 between bore angled surface 80 and sealing ring angled surface 82, forming a fluid seal between sealing ring 12 and engine body 19.

In addition to forming a fluid seal between sealing ring 12 and engine body 19, sealing ring 12 forms a fluid seal with injector body 28. More specifically, sealing ring 12 includes a sealing ring proximal end surface 76 and injector body 28 includes an injector body surface 86, and the clamp load that forms a fluid seal between sealing ring 12 and engine body 19 also forms a load path through sealing ring proximal end surface 76 and injector body surface 86 to create a fluid seal between sealing ring proximal end surface 76 and injector body surface 86.

Sealing ring 12 is sized, dimensioned, and formed of an appropriate material such that sealing ring 12 retains its structural integrity under the clamp load from the fuel injector 22 mounting or securement system. Sealing ring 12 is generally circular in shape and includes a longitudinally extending central ring passage 48 having a first ring diameter 52 formed by an annular lower ring wall portion 50, a second, larger ring diameter 54 formed by an annular upper ring wall portion 56, and a step or transition portion 58 positioned between lower ring wall portion 50 and upper ring wall portion 56. Upper ring wall portion 56 has a longitudinal length 72. In the exemplary embodiment, sealing ring 12 is formed of a single unitary piece. While sealing ring 12 may be formed of multiple pieces, a single piece is easier to form and assemble as opposed to two or more pieces. In an exemplary embodiment, sealing ring 12 is formed of a stainless steel material, which may be an SAE 303 stainless steel. In addition to the other benefits provided by sealing ring 12, the material of sealing ring 12 provides a thermal barrier to the combustion heat from combustion chamber 46.

Sealing ring 12 includes ring proximal end surface 76 and a sealing ring angled surface 82. As described hereinabove, proximal end surface 76 is sized and dimensioned to form a fluid seal with fuel injector body 28. In an exemplary embodiment, proximal end surface 76 is a flat, planar surface that abuts or contacts a distal end of housing retainer 36, which has a flat, planar injector body surface 86 that mates with proximal end surface 76.

Heat transfer sleeve 14 is sized, dimensioned, and formed of an appropriate material to yield when forced into an interference fit with another component, such as nozzle element housing 32 or sealing ring 12. Heat transfer sleeve 14 is a component that is fabricated distinctly or formed separately from sealing ring 12 of a material that is different from the material of sealing ring 12. The purpose of the two different materials is to beneficially combine a material having sufficient a structural or load bearing strength to receive the significant clamp loads required to secure fuel injector 22 in cylinder head 18 with an enhanced thermal conductivity to transport, transfer, or wick heat from a distal end of nozzle element housing 32 toward an upper portion of fuel injector 22 that is cooler than the distal end of nozzle element housing 32. The benefit to this heat transfer is that it reduces the temperature in the distal end of nozzle element housing 32, reducing nozzle tip temperatures and reducing the degradation of fuel, which can cause deposits on nozzle element housing 32. These deposits can contribute to erratic spray patters from fuel injector 22 as well as drift in the quantity of fuel injected. Heat transfer sleeve 14 includes a distal end 62, a proximal end or head portion 64, and a longitudinally extending portion 66 that connects distal end 62 to proximal end 64 to position proximal end 64 a spaced longitudinal distance from distal end 62. In the exemplary embodiment, heat transfer sleeve 14 is formed of a single unitary piece. While heat transfer sleeve 14 may be formed of multiple pieces, a single piece is easier to form and assemble as opposed to two or more pieces.

Distal end 62 has an inner surface 63 at a distal end diameter 68 that is smaller than the nozzle housing diameter. During assembly of fuel injector 22, when heat transfer sleeve 14 is positioned on nozzle element housing 32, inner surface 63 is adjacent to, mates with, abuts, or faces the peripheral outer surface of nozzle element housing 32 and heat transfer sleeve 14 achieves an interference fit with nozzle element housing 32 because distal end diameter 68 is smaller than the nozzle housing diameter. Furthermore, because heat transfer sleeve 14 is fabricated from a material that is softer or weaker than the material of nozzle element housing 32, heat transfer sleeve 14 yields or flexes during assembly rather than causing significant distortion or yielding of nozzle element housing 32. In the exemplary embodiment, heat transfer sleeve 14 is formed of a copper material, which in the exemplary embodiment is either UNS C15100 or UNS C15000 and includes an H01 temper. It should be understood that other materials having suitable thermal conductivity and suitable yield strength may also be used.

Proximal end 64 includes an exterior proximal end diameter that is larger than first ring diameter 52 and may be larger than second ring diameter 54. Proximal end 64 further includes an annular peripheral or outer surface 70. If the exterior proximal end diameter of proximal end 64 is larger than second ring diameter 54, then when heat transfer sleeve 14 is inserted into sealing ring 12 from a proximal end of sealing ring 12, peripheral surface 70 is adjacent to, faces, abuts, or mates with upper ring wall portion 56 and forms an interference or press fit with upper ring wall portion 56. Proximal end 64 includes a longitudinal length that is less than longitudinal length 72 of upper ring wall portion 56 so that when heat transfer sleeve 14 is inserted into sealing ring 12 and injector seal assembly 10 is positioned between fuel injector 22 and cylinder head 18, heat transfer sleeve 14 is able to move longitudinally because of a gap 74 that may be positioned longitudinally between injector body 28 and the proximal end of heat transfer sleeve 14, or may be positioned longitudinally between a distal end of proximal end 64 and step or transition portion 58, or gap 74 may be in both locations. The purpose of gap 74 is to prevent the significant clamp loads transmitted from injector body 28 through sealing ring 12 into cylinder head 18 from being transmitted through heat transfer sleeve 14. It should also be apparent from the description of proximal end 64 and length 72 that head portion 64 is captured between injector body 28 and step portion 58.

Longitudinally extending portion 66 connects distal end 62 with proximal end 64. Longitudinally extending portion 66 is a spaced radial distance from engine body 19, e.g., cylinder head 18, and a spaced radial distance from fuel injector 22, e.g., nozzle element housing 32. One purpose for spacing longitudinally extending portion 66 from fuel injector 22 is to reduce the assembly force required to press heat transfer sleeve 14 onto fuel injector 22, which might otherwise cause heat transfer sleeve 14 to distort under the force of assembly or installation. Longitudinally extending portion 66 may have a diameter greater than first ring diameter 52 where the outer surface of longitudinally extending portion 66 is adjacent to, faces, abuts, or mates with lower ring wall portion 50, which would thus cause longitudinally extending portion 66 to be a press or interference fit with lower ring wall portion 50. Heat transfer sleeve 14 may be an interference or press fit with lower ring wall portion 50, with upper ring wall portion 56, or with both lower ring wall portion 50 and upper ring wall portion 56. One benefit to using one component, i.e., sealing ring 12, as a seal and to receive the clamping forces that hold fuel injector 22 into cylinder head 18, and a second component, i.e., heat transfer sleeve 14 in a location extending from a distal end of nozzle element housing 32 to sealing ring 12, is that injector seal assembly 10 achieves the core benefit of combustion sealing combined with a heat transfer function. The heat is received by heat transfer sleeve 14 at the distal end of nozzle element housing 32 and the heat is readily conducted from heat transfer sleeve 14 into sealing ring 12, where the heat may then flow into fuel injector body 28, e.g., housing retainer 36. Another benefit to this contact is that it is easier to assemble sealing ring 12 and separate heat transfer sleeve 14 as an assembly prior to attaching sealing ring 12 and heat transfer sleeve 14 to fuel injector 22 rather than attaching each component to fuel injector 22 individually.

Figure 3:
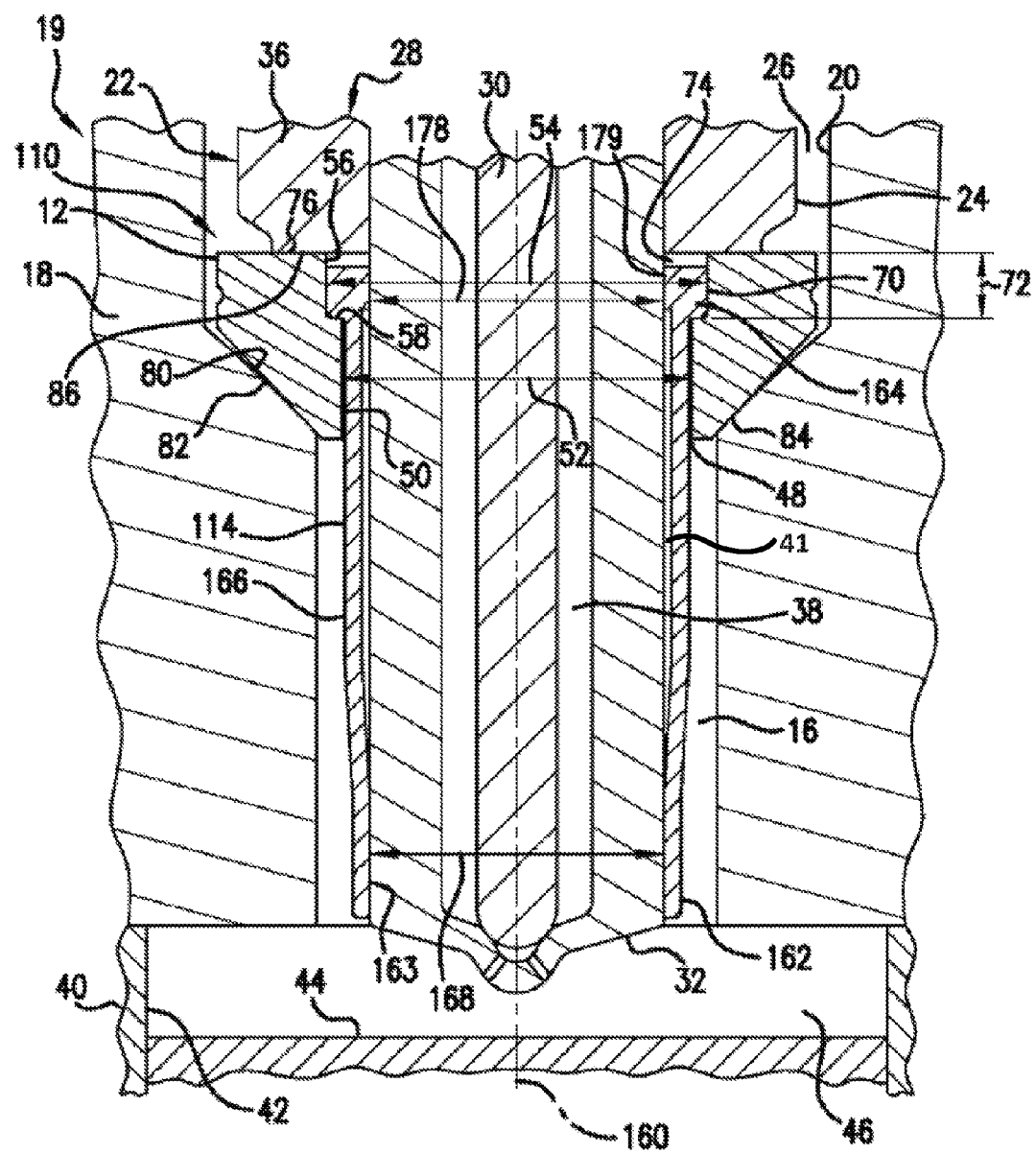
FIG. 3 is a cross-sectional view of an injector seal assembly in accordance with a second exemplary embodiment of the present disclosure inserted into position in an engine mounting bore.

Referring now to FIG. 3, a second exemplary embodiment of the present disclosure is shown. Elements that are the same as the first embodiment are numbered the same as the first embodiment, and are described in this embodiment only for the sake of clarity. A second exemplary embodiment of an injector seal assembly, generally indicated at 110 in FIG. 3, includes seal component, sealing ring, or spacer component 12, and a heat transfer sleeve, heat transfer inner sleeve, or thermally conductive component 114, for positioning in fuel injector mounting bore 16 formed in a portion, e.g, cylinder head 18, of engine body 19 of an internal combustion engine. Cylinder head 18 includes interior surface 20 that forms fuel injector mounting bore 16. The internal combustion engine also includes fuel injector 22, which includes peripheral exterior surface 24, positioned in fuel injector mounting bore 16. Interior surface 20 of fuel injector mounting bore 16 and exterior surface 24 of fuel injector 22 forms annular gap or passage 26 that extends radially between fuel injector 22 and cylinder head 18.

Fuel injector 22 includes a plurality of components, including injector body 28 in which is positioned needle or nozzle valve element 30. Injector body 28 includes nozzle element housing 32 and housing retainer 36 that attaches nozzle element housing 32 to fuel injector 22. Injector body 28 also includes nozzle element cavity 38 in which nozzle valve element 30 is positioned for reciprocal movement along a fuel injector longitudinal axis 160. Nozzle element housing 32 includes a nozzle housing diameter.

Annular gap or passage 26 is simply, easily and reliably sealed from combustion chamber 46 to isolate annular gap or passage 26 from combustion chamber 46 by insertion of injector seal assembly of 110 between fuel injector 22 and a portion of the internal combustion engine, e.g., cylinder head 18. Injector seal assembly 110 provides a metal to metal combustion seal with contact pressures high enough to yield sealing ring 12 into sealing contact against interior surface 20 of injector mounting bore 16, and then maintain that contact pressure with the force from the fuel injector 22 mounting or securement system (not shown). That is, the injector clamping or securing load, for securing fuel injector 22 in mounting bore 16, is relied upon to apply a sealing force to sealing ring 12. In an exemplary embodiment, injector mounting bore 16 includes angled surface 80 and sealing ring 12 includes sealing ring angled surface 82 that contacts bore angled surface 80 when injector seal assembly 110 is positioned in injector mounting bore 16. In an exemplary embodiment, bore angled surface 80 is at a full angle of about 90 degrees, and sealing ring angled surface 82 is at a full angle of about 87.25 degrees. The clamp load that holds fuel injector 22 in injection mounting bore 16 causes annular line of contact 84 between bore angled surface 80 and sealing ring angled surface 82, forming a fluid seal between sealing ring 12 and engine body 19. Sealing ring 12 is configured as previously described.

Heat transfer sleeve 114 is sized, dimensioned, and formed of an appropriate material to yield when forced into an interference fit with another component, such as nozzle element housing 32 or sealing ring 12. Heat transfer sleeve 114 includes a distal end 162, a proximal end 164, and a longitudinally extending portion 166 that connects distal end 162 to proximal end 164.

Distal end 162 has a distal end diameter 168 that is smaller than the nozzle housing diameter and an inner surface 163. During assembly of fuel injector 22, when heat transfer sleeve 114 is positioned on nozzle element housing 32, heat transfer sleeve 114 achieves an interference fit with nozzle element housing 32 because inner surface 163 is adjacent to, mates with, abuts, or faces the peripheral outer surface of nozzle element housing 32 and because distal end diameter 168 is smaller than the nozzle housing diameter. Furthermore, because heat transfer sleeve 114 is formed from a material that is softer or weaker than the material of nozzle element housing 32, heat transfer sleeve 114 yields or flexes during assembly rather than causing significant distortion or yielding of nozzle element housing 32. In the exemplary embodiment, heat transfer sleeve 114 is formed of a copper material, which in the exemplary embodiment is either UNS C15100 or UNS C15000 and includes an H01 temper. It should be understood that other materials having suitable thermal conductivity and suitable yield strength may also be used.

Proximal end 164 includes an exterior proximal end diameter that is larger than first ring diameter 52 and may be larger than second ring diameter 54. Proximal end 164 further includes annular peripheral or outer surface 70. If the exterior proximal end diameter of proximal end 164 is larger than second ring diameter 54, then when heat transfer sleeve 114 is inserted into sealing ring 12, peripheral surface 70 forms an interference or press fit with upper ring wall portion 56. Proximal end 164 includes a longitudinal length that is less than longitudinal length 72 of upper ring wall portion 56 so that when heat transfer sleeve 114 is inserted into sealing ring 12 and injector seal assembly 110 is positioned between fuel injector 22 and cylinder head 18, heat transfer sleeve 114 is able to move longitudinally because of gap 74 that may be positioned longitudinally between injector body 28 and the proximal end of heat transfer sleeve 114, or may be positioned longitudinally between a distal end of proximal end 64 and transition portion 58, or gap 74 may be in both locations. The purpose of gap 74 has been described hereinabove.

Longitudinally extending portion 166 connects distal end 162 with proximal end 164. Longitudinally extending portion 166 is a spaced distance from engine body 19, e.g., cylinder head 18, and a spaced distance from fuel injector 22, e.g., nozzle element housing 32. Longitudinally extending portion 166 may have a diameter greater than first ring diameter 52 where longitudinally extending portion 166 is adjacent to, faces, abuts, or mates with lower ring wall portion 50, which would thus cause longitudinally extending portion 166 to be a press or interference fit with lower ring wall portion 50. Heat transfer sleeve 114 may be an interference or press fit with lower ring wall portion 50, with upper ring wall portion 56, or with both lower ring wall portion 50 and upper ring wall portion 56. One benefit to the contact between heat transfer sleeve 114 and sealing ring 12 is that heat is readily conducted from heat transfer sleeve 114 into sealing ring 12, where the heat may then flow into fuel injector body 28. A benefit to the press fit contact is that it is easier to assemble sealing ring 12 to separate heat transfer sleeve 114 rather than positioning heat transfer sleeve 114 on nozzle element housing 32 and then attaching sealing ring 12 to heat transfer sleeve 114.

Proximal end 164 also includes an interior diameter 178, which in this embodiment is smaller than the outside diameter of nozzle element housing 32, and an annular inner surface 179. The result of this dimension is that inner surface 179 of proximal end 164 of heat transfer sleeve 114 is a press or interference fit with nozzle element housing 32. Thus, heat transfer sleeve 114 is a press or interference fit with nozzle element housing 32 at distal end 162 and at proximal end 164, and a press or interference fit with sealing ring 12, as described in the first embodiment. The choice of locations for interference fits will depend on the need to secure heat transfer sleeve 114 with respect to nozzle element housing 32 and sealing ring 12.

Figure 4:
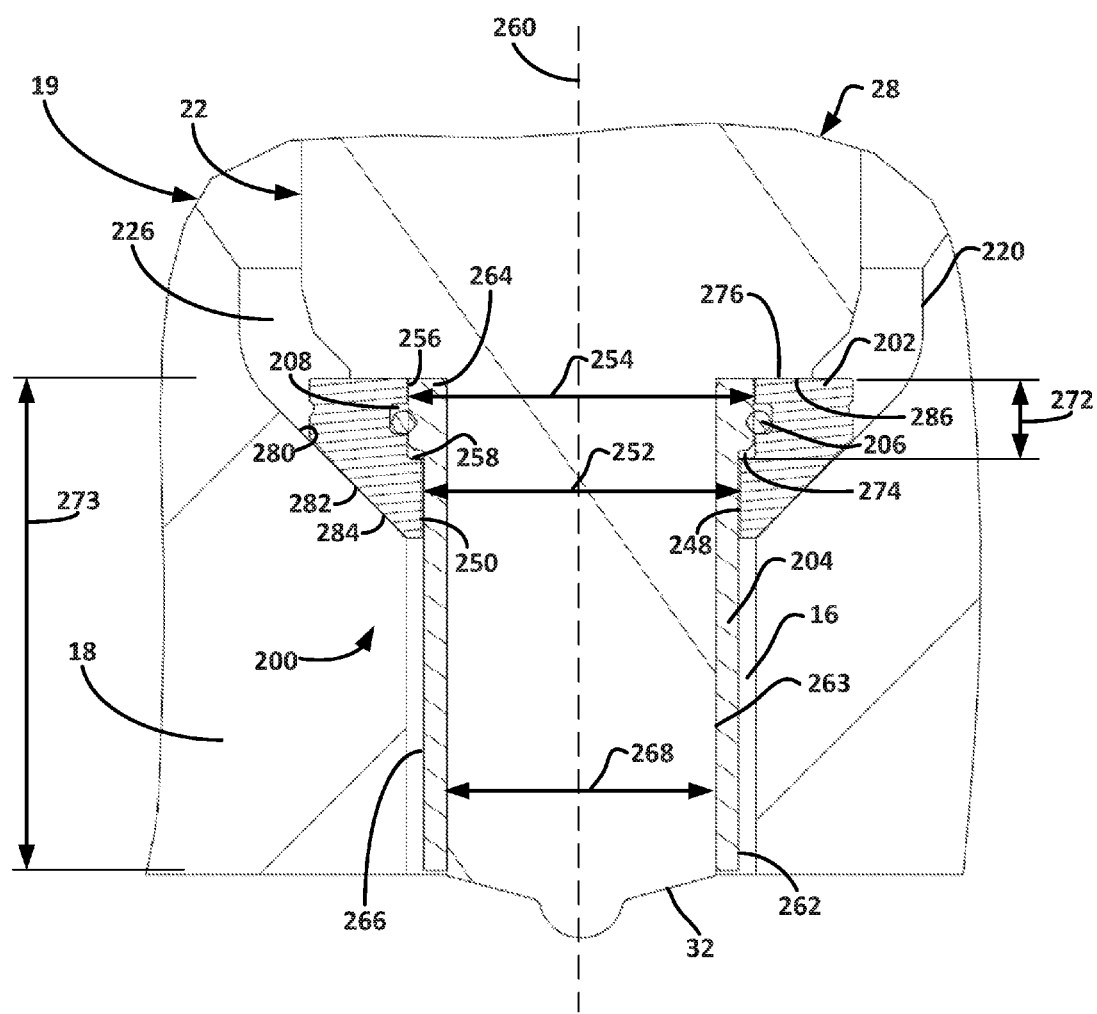
FIG. 4 is a cross-sectional view of an injector seal assembly in accordance with a third exemplary embodiment of the present disclosure inserted into position in an engine mounting bore.

FIG. 4 is a cross-sectional view of an injector seal assembly 200 (hereinafter "seal assembly 200") inserted into position in an engine mounting bore in accordance with a third exemplary embodiment of the present disclosure. In the illustrative embodiment of FIG. 4, seal assembly 200 is inserted into position in fuel injector mounting bore 16. Seal assembly 200 includes a seal component, sealing ring, or spacer component 202 formed of a first material, and a heat transfer sleeve, heat transfer inner sleeve, or thermally conductive component 204 that is formed of a second material that is different from the first material, for positioning in a fuel injector mounting bore 16 formed in a portion, e.g, cylinder head 18, of an engine body 19 of an internal combustion engine.

Figure 5:
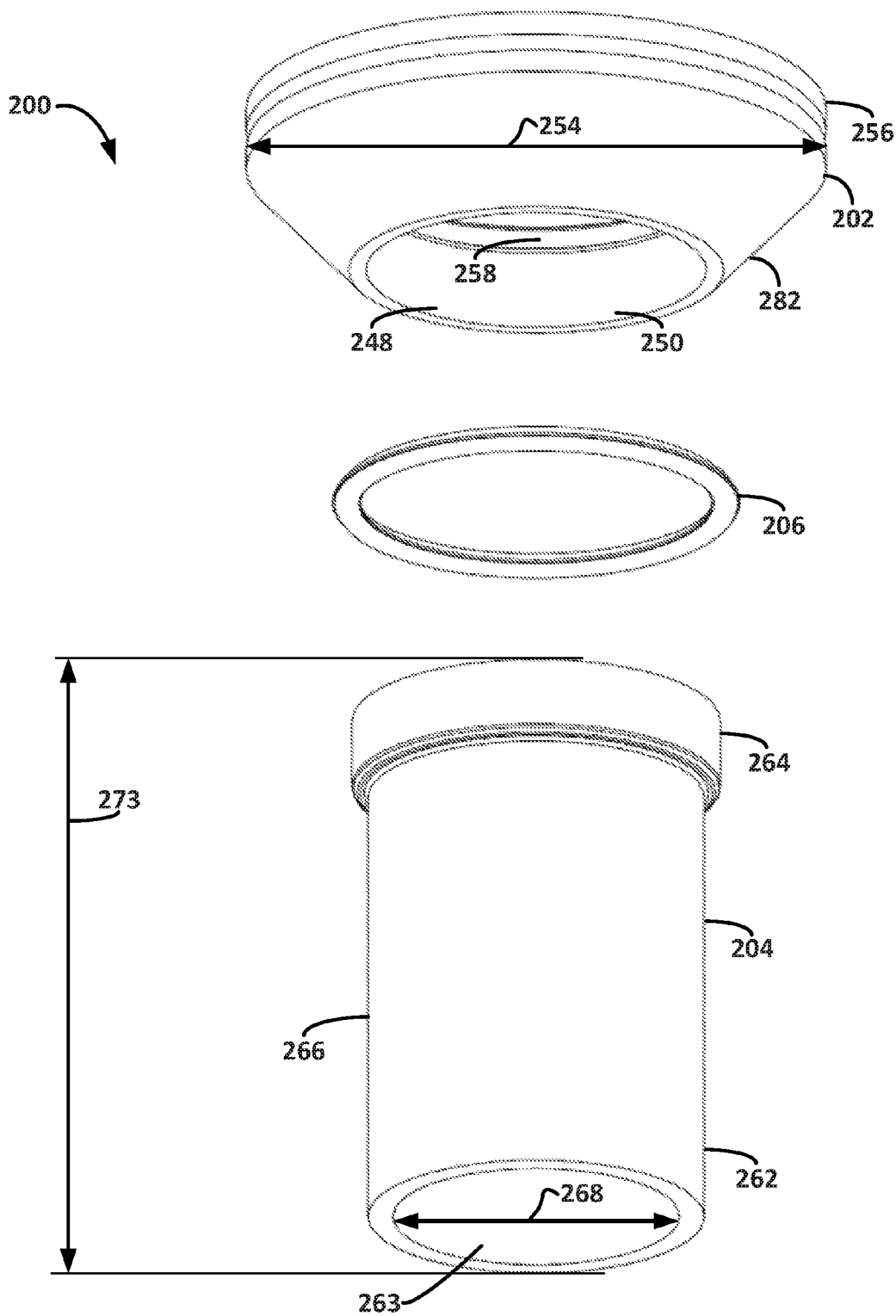
FIG. 5 is a perspective view of the components that form the injector seal assembly of FIG. 4.
Figure 6:
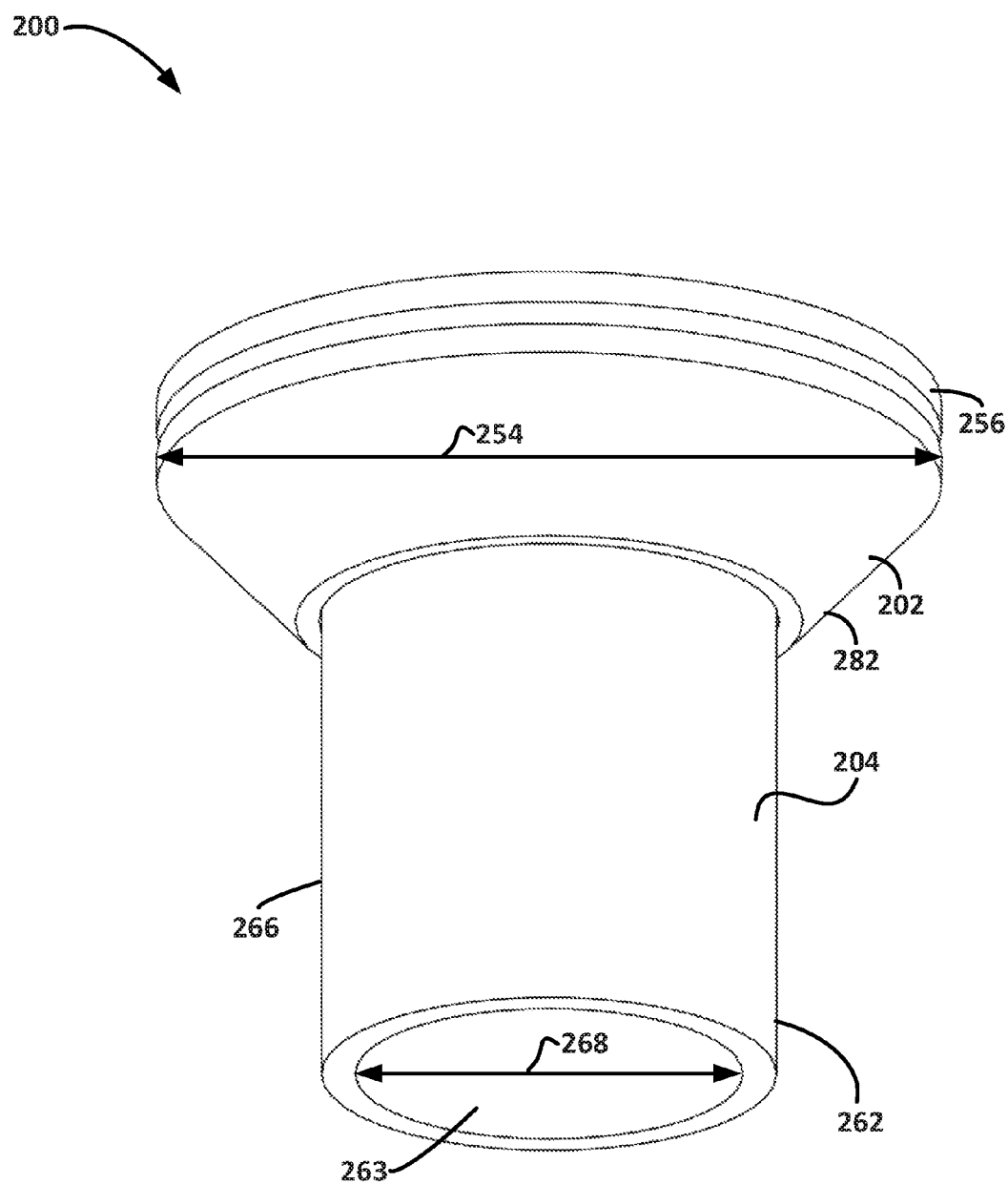
FIG. 6 is a perspective view of the injector seal assembly of FIG. 4.

In the illustrative embodiment of FIGS. 5 and 6, sealing ring 202 and heat transfer sleeve 204 are formed as distinct or separate components and are connected or coupled to each other to form injector seal assembly 200 as described in more detail hereinbelow. In various embodiments of the present disclosure, sealing ring 202 may include an annular groove/recess 208 and seal assembly 200 may further include seal O-ring 206 positioned intermediate sealing ring 202 and heat transfer sleeve 204 by way of annular groove 208. In an alternative embodiment, sealing ring 202 and heat transfer sleeve 204 may be manufactured as a single component. In the illustrative embodiment of FIG. 4, the internal combustion engine also includes a fuel injector 22 having a peripheral exterior surface positioned in fuel injector mounting bore 16. Interior surface 220 of fuel injector mounting bore 16 and the exterior surface of fuel injector 22 forms an annular gap or passage 226 that extends radially between fuel injector 22 and cylinder head 18. As discussed above, fuel injector 22 injects fuel into an exemplary combustion chamber. The process of combustion needs to be separated from annular gap or passage 26. In the absence of adequate separation, damage to fuel injector 22, cylinder head 18, and other components of the internal combustion engine can occur.

Much like injector seal assembly 10, seal assembly 200 beneficially combines combustion sealing with an enhanced ability to conduct, transfer, or wick heat away from the distal end of fuel injector 22 to maintain the reliability of fuel injector 22. Moreover, seal assembly 200 is structured to withstand/carry the fuel injector clamp loads and maintain structural integrity when clamped between fuel injector 22 and cylinder head 18. In one embodiment, seal assembly 200 is comprised of a load carrying stainless steel conical sealing ring 202 with a copper heat transfer sleeve 204. The conical portion of sealing ring 202 allows for fuel injector 22 to seal properly to an exemplary cylinder head within engine body 19 and carry the clamping load exerted by fuel injector 22. Prior art injector seal assembly designs used a sealing ring comprising a copper design. However, prior art shield and sealing ring interface designs demonstrated a propensity to warp or creep due to the elevated combustion temperatures and substantial fuel injector clamp loads. In contrast to the prior art design, an exemplary sealing ring 202 and sleeve 204 provide the required thermal barrier to the combustion heat in the cylinder head deck that the prior art designs do not.

In the illustrative embodiment of FIG. 4, sealing ring 202 is positioned longitudinally (e.g. along longitudinal axis 260) between injector body 28 and a sealing surface formed in fuel injector mounting bore 16. In this embodiment, seal assembly 200 provides a metal to metal combustion seal having contact pressures high enough to yield sealing ring 202 into sealing contact against interior surface 220 of injector mounting bore 16. The injector clamping or securing load, for securing fuel injector 22 in mounting bore 16, is relied upon to apply a sealing force to sealing ring 202. In an exemplary embodiment, injector mounting bore 16 includes a bore sealing/angled surface 280 positioned at an angle to longitudinal axis 260, thereby providing a conical sealing surface. Sealing ring 202 includes sealing ring angled surface 282 that contacts bore angled surface 280 when sealing ring 202 is positioned longitudinally between injector body 28 and sealing surface 280 in injector mounting bore 16. In various embodiments, the contact between sealing ring angled surface 282 and sealing surface 280 forms a fluid seal. In one embodiment, the clamp load that holds fuel injector 22 in mounting bore 16 transfers load through a load path that includes an annular line of contact 284 between bore angled surface 280 and sealing ring angled surface 282, forming a fluid seal between sealing ring 12 and engine body 19 (i.e. at bore angle surface 280). In addition to forming a fluid seal between sealing ring 202 and engine body 19, sealing ring 202 forms a fluid seal with injector body 28. More specifically, sealing ring 202 includes a sealing ring end surface 276 and injector body 28 includes an injector body surface 286, and the clamp load that forms a fluid seal between sealing ring 202 and engine body 19 also forms a load path through sealing ring end surface 276 and injector body surface 286 to create a fluid seal between sealing ring end surface 276 and injector body surface 286.

Sealing ring 202 is formed of an appropriate material such that sealing ring 202 retains its structural integrity under the clamp load from fuel injector 22. Sealing ring 202 is generally circular in shape and includes a central ring passage 248 having a first ring diameter 252 formed by an annular lower ring wall portion 250, a second, larger ring diameter 254 formed by an annular upper ring wall portion 256, and a step or transition portion 258 positioned between lower ring wall portion 250 and upper ring wall portion 256. In one embodiment, sealing ring 202 is formed of a single unitary piece. As discussed above, in an exemplary embodiment, sealing ring 202 may be formed of a stainless steel material, which may be an SAE 303 stainless steel. In one embodiment, upper ring wall portion 256 of sealing ring 202 has a longitudinal length 272 and includes annular groove or recess 208 structured to receive seal O-ring 206.

In the illustrative embodiment of FIG. 4, heat transfer sleeve 204 provides retention onto nozzle 32 by way of a press fit which also allows heat to leave an exemplary combustion chamber and transfer toward cooler temperature portions of injector body 28. In one embodiment, a stainless steel conical sealing ring 202 is slip-fit over a copper heat transfer sleeve 204. In this embodiment, sealing ring 202 and heat transfer sleeve 204 are retained onto fuel injector 22 by way of O-ring seal 206 during assembly into an exemplary cylinder head. In contrast to seal assembly 10 of FIG. 1 and seal assembly 110 of FIG. 3, seal assembly 200 does not rely on or utilize a press fit between conical sealing ring 202 and heat transfer sleeve 204. The present disclosure therefore provides an improved injector seal assembly having a stainless steel conical seal 202 that is easily replaceable at any fuel injector service event.

Heat transfer sleeve 204 is formed of an appropriate material to yield when forced into an interference fit with another component, such as nozzle 32 or sealing ring 202. In one embodiment, heat transfer sleeve 204 is formed separately from sealing ring 202 of a material that is different from the material of sealing ring 202. The two different materials allows for combining a first material having sufficient structural or load bearing strength to receive the significant clamp loads required to secure fuel injector 22 in cylinder head 18 with a second material having enhanced thermal conductivity to transfer or wick heat from a distal end of nozzle 32 toward an upper portion of fuel injector 22 that is cooler than the distal end of nozzle 32. This heat transfer reduces the temperature in the distal end of nozzle 32 thereby reducing nozzle 32 tip temperatures and reducing the degradation of fuel which can cause carbon deposits on nozzle 32. These carbon deposits can contribute to erratic spray patterns from fuel injector 22 as well as drift in the quantity of fuel injected. In one embodiment, heat transfer sleeve 204 is formed of a single unitary piece and includes a distal end 262, a proximal end 264, and a longitudinally extending portion 266 that connects distal end 262 to proximal end 264.

Distal end 262 of heat transfer sleeve 204 has an inner surface 263 at a distal end diameter 268 that is smaller than the nozzle housing diameter. During assembly of fuel injector 22, when heat transfer sleeve 204 is positioned on nozzle 32, inner surface 263 is adjacent to, mates with, abuts, or faces the peripheral outer surface of nozzle 32 and heat transfer sleeve 204 achieves an interference fit with nozzle 32 because distal end diameter 268 is smaller than the nozzle diameter. Furthermore, heat transfer sleeve 204 is generally comprised of a material that is softer than the material of nozzle element housing 32. As such, heat transfer sleeve 204 is structured to yield or flex during assembly rather than causing significant distortion or yielding of nozzle element housing 32. In one embodiment, heat transfer sleeve 204 is formed of a copper material such as, for example, either UNS C15100 or UNS C15000 and includes an H01 temper. In accordance with the present disclosure, it should be understood that other materials having suitable thermal conductivity and suitable yield strength may also be used. In contrast to heat transfer sleeve 14 and 114 of seal assembly 10 and 110 respectively, heat transfer sleeve 204 includes an embodiment in which a substantial lengthwise portion of longitudinally extending portion 266 directly contacts or abuts with the exterior surface of nozzle housing 32. As shown in the illustrative embodiment of FIG. 4, heat transfer sleeve 204 may include a lengthwise portion defined by sleeve length 273 wherein the entire lengthwise portion of heat transfer sleeve 204 contacts or abuts the exterior surface of nozzle housing 32. As shown in the illustrative embodiment of FIG. 1 and FIG. 3, seal assemblies 10 and 110 each include an air gap 41 located, for example, intermediate an interior surface of heat transfer sleeve 14 and exterior surface of nozzle element housing 32. Accordingly, the disclosed embodiment of FIG. 4 features a full length nozzle press fit rather than including an air gap 41.

Proximal end 264 includes an exterior proximal end diameter that is larger than first ring diameter 252. Proximal end 264 includes a longitudinal length that is less than longitudinal length 272 of upper ring wall portion 256 so that when heat transfer sleeve 204 is inserted into sealing ring 202 and injector seal assembly 200 is positioned between fuel injector 22 and cylinder head 18, heat transfer sleeve 204 is able to move longitudinally because of a gap 274 that may be positioned between injector body 28 and either above or below the proximal end of heat transfer sleeve 204. It is required that there is contact between heat transfer sleeve 204 and injector body surface 286 to ensure thermal conductivity. In the embodiment of FIG. 4, gap 274 is located adjacent transition portion 258 of sealing ring 202. In this embodiment, gap 274 prevents the significant clamp loads transmitted from injector body 28 through sealing ring 202 into cylinder head 18 from being transmitted through heat transfer sleeve 204. It should also be apparent from the description of proximal end 264 and length 272 that proximal end 264 is captured between injector body 28 and step/transition portion 258.

Longitudinally extending portion 266 connects distal end 262 with proximal end 264 and may have an outer diameter greater than first ring diameter 252 where the outer surface of longitudinally extending portion 266 is adjacent to, faces, abuts, or mates with lower ring wall portion 250. Heat transfer sleeve 204 may be in contact with lower ring wall portion 250, with upper ring wall portion 256, or with both lower ring wall portion 250 and upper ring wall portion 256. Additionally, the contact between sealing ring 202, heat transfer sleeve 204, fuel injector 22, and cylinder head 18 is optimized to transfer heat from the distal end of fuel injector 22 upwardly to a cooler portion of fuel injector 22, providing a thermal path for heat from the distal end of fuel injector 22. The heat is received by heat transfer sleeve 204 at the distal end of nozzle 32 and readily conducted through heat transfer sleeve 204 into sealing ring 202, where the heat may then flow into fuel injector body 28.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A fuel injector seal assembly, comprising:
   a seal member comprising a first section, a second section and an annular recess disposed in the first section, the first section having a first diameter and the second section having a second diameter wherein the first diameter is greater than the second diameter;
   a ring seal disposed in the annular recess intermediate the seal member and a sleeve member, the ring seal structured to at least one of seal combustion gases from moving toward a body portion of a fuel injector and secure the seal member to the fuel injector; and
   the sleeve member comprising a first end received by the first section of the seal member, the sleeve member further including a lengthwise portion configured to press fit around a nozzle housing of the fuel injector to cause heat transfer from the nozzle housing toward the body portion of the fuel injector.

2. The fuel injector seal assembly of claim 1, wherein the sleeve member further comprises a second end and an inner surface dimensioned to exert a radial force inwardly on the nozzle housing along the lengthwise portion extending between the first end and the second end.

3. The fuel injector seal assembly of claim 1, wherein the seal member is formed from a first material and the sleeve member is formed from a second material that is different from the first material.

4. The fuel injector seal assembly of claim 3, wherein the first material is a stainless steel material and wherein the second material is a copper material.

5. The fuel injector seal assembly of claim 4, wherein the stainless steel material is SAE 303 and wherein the copper material is one of the group consisting of UNS C15100 and UNS C15000, including an H01 temper.

6. An internal combustion engine, comprising:
   a mounting bore comprising a sealing surface;
   a fuel injector positioned in the mounting bore, the fuel injector comprising an injector body and a nozzle housing; and
   an injector seal assembly comprising a seal member and a sleeve member with a gap therebetween, the gap configured to inhibit clamp loads from being transmitted from the injector body through the sleeve member;
   wherein the sleeve member is press fit around the nozzle housing at an inner surface having a lengthwise portion that abuts the nozzle housing and the seal member is sealingly positioned around the sleeve member adjacent the injector body;
   the seal member further including an annular recess configured to receive a ring seal.

7. The internal combustion engine of claim 6, wherein the ring seal disposed between the seal member and the sleeve member, the ring seal structured to at least one of seal combustion gases from moving toward the injector body of the fuel injector and secure the seal member to the fuel injector.

8. The internal combustion engine of claim 6, wherein the seal member further comprises a first section and a second section, the first section having a first diameter and the second section having a second diameter that is less than the first diameter.

9. The internal combustion engine of claim 6, wherein the mounting bore comprises a longitudinal axis and the sealing surface is formed at a first angle relative to the longitudinal axis.

10. The internal combustion engine of claim 9, wherein the seal member is positioned longitudinally between the injector body and the sealing surface to create a fluid seal between the seal member and the mounting bore.

11. The internal combustion engine of claim 9, wherein the seal member further comprises an outer angled surface configured such that a clamp load that holds the fuel injector in the mounting bore transfers load through a load path that includes an annular line of contact between the sealing surface and the outer angled surface to form a fluid seal between the seal member and the mounting bore.

12. The internal combustion engine of claim 6, wherein the sleeve member further comprises a first end and a second end, the sleeve member inner surface being structured to exert a radial force inwardly on the nozzle housing along the lengthwise portion that extends between the first end and the second end.

13. The fuel injector seal assembly of claim 6, wherein the seal member is formed from a first material and the sleeve member is formed from a second material that is different from the first material.

14. An internal combustion engine, comprising:
    a mounting bore comprising a sealing surface;
    a fuel injector positioned in the mounting bore, the fuel injector comprising an injector body and a nozzle housing; and
    an injector seal assembly including a seal member comprising an annular recess, a sleeve member and a ring seal disposed in the annular recess, the seal member being sealingly positioned adjacent the injector body and around the sleeve member, and the ring seal being structured to at least one of seal combustion gases from moving toward the injector body of the fuel injector and secure the seal member to the fuel injector;
    the injector seal assembly further including a gap between the seal member and the sleeve member, the gap configured to inhibit clamp loads from being transmitted from the injector body through the sleeve member;
    wherein the sleeve member comprises a first end that is received by the seal member and contacts the ring seal and, wherein the sleeve member comprises a lengthwise portion having an inner surface that is press fit around the nozzle housing.

15. The internal combustion engine of claim 14, wherein the seal member further comprises a first section having a first diameter and a second section having a second diameter, wherein the first diameter is greater than the second diameter and wherein the annular recess is disposed in the first section.

16. The internal combustion engine of claim 14, wherein the sleeve member further comprises a second end and the sleeve member inner surface is structured to exert a radial force inwardly on the nozzle housing along the lengthwise portion that extends between the first end and the second end.

17. The internal combustion engine of claim 14, wherein the mounting bore further comprises a longitudinal axis and the sealing surface is formed at a first angle relative to the longitudinal axis.

18. The internal combustion engine of claim 17, wherein the seal member is positioned longitudinally between the injector body and the sealing surface to create a fluid seal between the seal member and the mounting bore.

19. The internal combustion engine of claim 14, wherein the seal member further comprises an outer angled surface such that a clamp load that holds the fuel injector in the mounting bore transfers load through a load path that includes an annular line of contact between the sealing surface and the outer angled surface to form a fluid seal between the seal member and the mounting bore.

20. An injector seal assembly, comprising:
a spacer component including an annular recess configured to receive a ring seal, the spacer component formed of a first material and structured to be positioned in a space between a fuel injector body and an engine cylinder head sealing surface; and
a thermally conductive component formed of a second material and structured to be positioned radially between the fuel injector body and the spacer component in contact with the fuel injector body and the spacer component to transfer heat from the fuel injector body to the spacer component;
wherein the second material has a higher thermal conductivity than the first material.

21. The injector seal assembly of claim 20, wherein the spacer component is structured to receive a fuel injector clamp load and transmit the fuel injector clamp load to the engine cylinder head sealing surface independent of the thermally conductive component.

22. The injector seal assembly of claim 20, wherein the thermally conductive component comprises heat transfer sleeve having a first end structured to engage a tip of the fuel injector body and a second end structured to engage the spacer component, the heat transfer sleeve being configured to transfer heat from the fuel injector tip to the spacer component.

23. The injector seal assembly of claim 20, wherein the first end of the heat transfer sleeve is dimensioned to exert a radial force inwardly on the fuel injector body.

24. The injector seal assembly of claim 20, wherein the first material is a stainless steel material and the second material is a copper material.

* * * * *